United States Patent [19]

Nagata et al.

[11] 3,812,804

[45] May 28, 1974

[54] APPARATUS FOR FLOATING A VEHICLE FOR UNDERWATER OPERATION

[75] Inventors: Yoshihiro Nagata; Tadashi Yoda; Yoshinobu Tanaka, all of Osaka, Japan

[73] Assignee: Kabushiki Kaisha Komatsu Seisakusho, Tokyo, Japan

[22] Filed: July 29, 1971

[21] Appl. No.: 167,344

[30] Foreign Application Priority Data
July 29, 1970  Japan.............................. 45-65762

[52] U.S. Cl................. 114/16 R, 61/69 R, 115/1 R
[51] Int. Cl........................... B63g 8/00, B63g 8/14
[58] Field of Search............. 114/16 R, 123, 53, 54, 114/16 E; 61/69; 244/105; 115/1 R; 91/91, 92, 93, 34, 40, 137

[56] References Cited
UNITED STATES PATENTS

| 2,514,488 | 7/1950 | Hale et al............................ 115/1 R |
| 3,099,189 | 7/1963 | Blondiau........................... 92/34 UX |
| 3,467,343 | 9/1969 | Violleau.............................. 244/105 |
| 3,621,604 | 11/1971 | Danielsen et al.................. 114/16 E |
| 3,633,530 | 1/1972 | Murata.............................. 114/16 E |

Primary Examiner—Duane A. Reger
Assistant Examiner—Galen L. Barefoot
Attorney, Agent, or Firm—Armstrong, Nikaido & Wegner

[57] ABSTRACT

An apparatus for floating a vehicle for operating under water and which has a pair of floats each having upper and lower convex members and a resilient cylinder and secured to both sides of the vehicle, and pipes for feeding compressed air to the floats.

4 Claims, 3 Drawing Figures

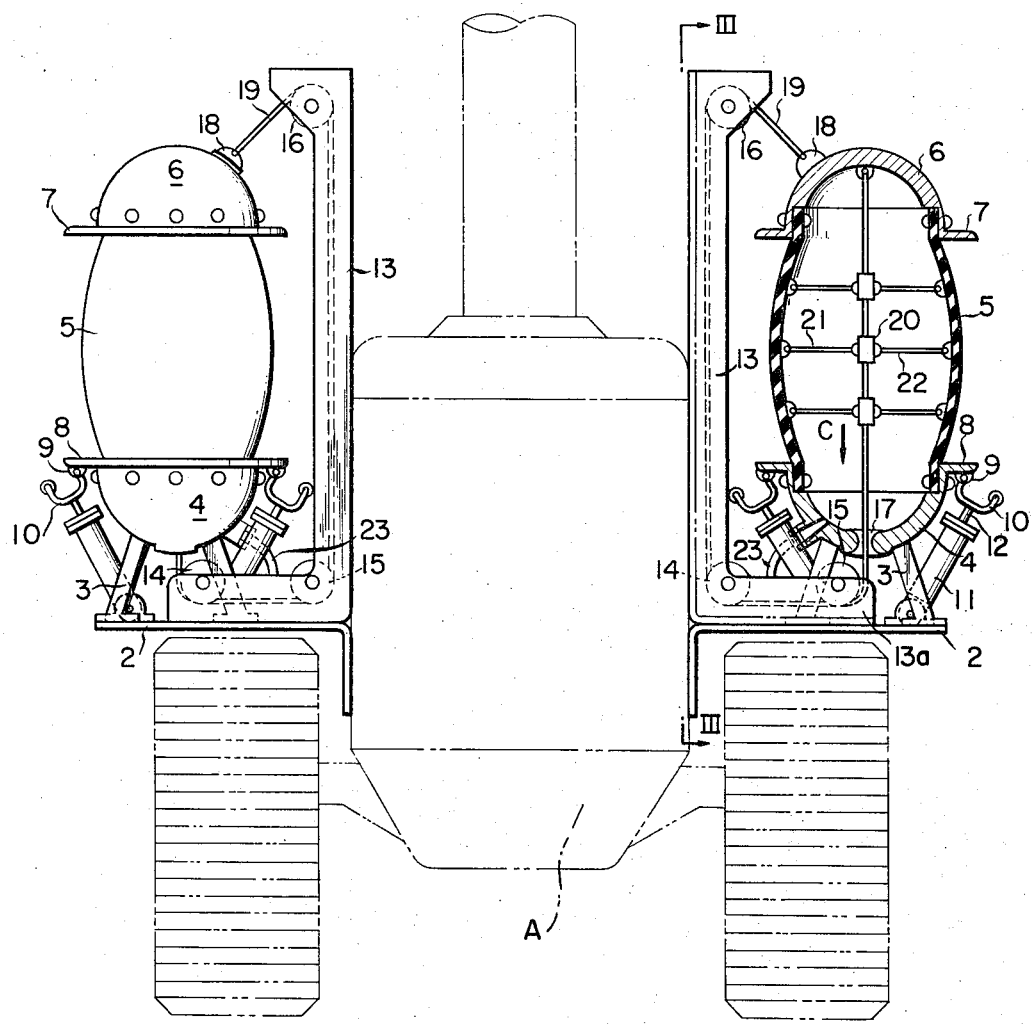
FIG. I

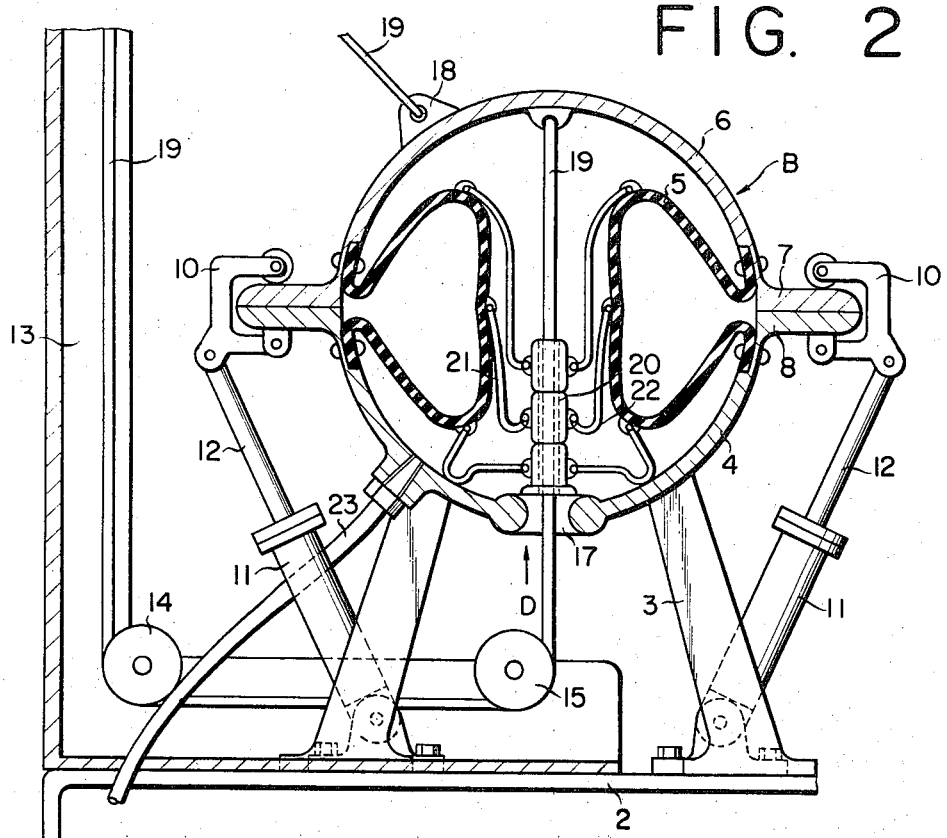
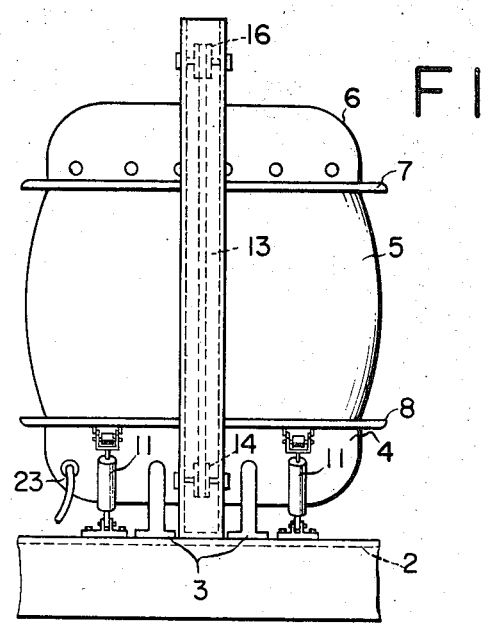

APPARATUS FOR FLOATING A VEHICLE FOR UNDERWATER OPERATION

This invention relates to an apparatus for floating a vehicle such as an under-water bulldozer for working on the bottom of the water.

Since a vehicle for working under water operates on the bottom of the water, it is necessary to submerge or float the vehicle from the water-surface or land onto the bottom of the water or vice versa, respectively. For that purpose, heretofore, the conventional vehicle has had a metal float or floats always of constant volume, and the buoyancy of the float was removed by introducing water into the float so as to submerge the vehicle. The buoyancy of the float is created by introducing compressed air into the floats so as to float the vehicle on the water surface. Thus, since the float of the conventional under-water working vehicle always has a constant volume, even if the float is not necessary in the case where the vehicle is working on the bottom of the water or is stopped on the land, or it is bulky and in the way, or when the float provides inefficient working on the bottom of the water due to the water pressure resistance acting on the float as its disadvantages.

It is an object of this invention to eliminate the aforesaid disadvantages of the conventional vehicle and to provide an apparatus for floating a vehicle for operating under water which is expandable and contractible and is simple in structure.

It is another object of this invention to provide an apparatus for floating a vehicle for operating under water which comprises a pair of floats each having upper and lower convex members and a resilient cylinder wherein the resilient cylinder may be encompassed within a container made of the upper and lower convex members upon contraction of the floats.

It is a further object of this invention to provide an apparatus for floating a vehicle for operating under water in which the upper and lower convex members are fixed integrally to each other upon contraction of the floats.

It is still another object of this invention to provide an apparatus for floating a vehicle for operating under water which comprises a pair of floats, each having upper and lower convex members and a resilient cylinder attaching to both sides of the vehicle by securing the lower convex members thereto, and pipes for feeding compressed air to the floats.

The other objects, features and advantages ot the present invention will become apparent from the following description taken in conjunction with the accompanying drawings, in which:

FIG. 1 is a partial front sectional view of one embodiment of expanded apparatus for floating a vehicle wherein such structure is mounted on the vehicle;

FIG. 2 is partial sectional view of the contracted apparatus for floating the vehicle of this invention; and FIG. 3 is a side view of the apparatus taken along the line III—III in FIG. 1.

Reference is now made to the drawings, which show one embodiment of the apparatus for floating a vehicle for operating under water which is constructed according to the present invention. In FIG. 1, reference character A schematically illustrates an under-water working vehicle. Reference numerals 2 show steps fixed to both sides of the vehicle body 1, and a pair of floats generally designated by B and each comprising a lower convex member 4 made of metal material and of generally a dish or semi-spherical shape and mounted through brackets 3, 3 to the step 2, a resilient cylinder 5 made, for example, of rubber material, and an upper convex member 6 made of metal and of generally dish or semi-spherical shape. The resilient cylinder 5 is fixed at the lower and outer peripheral edge to the upper and inner peripheral edge of the lower convex member 4 and is also fixed at the upper and outer peripheral edge to the lower and inner peripheral edge of the upper convex member 6. Flanges 7 and 8 are provided to the lowermost and uppermost edges of the outer peripheries of the upper and lower convex members 6 and 7, respectively. Brackets 9, 9 are provided on both lower surfaces of the flanges 8 of the lower convex member 4, and connectors 10, 10 of inversed U-shape in side view are pivotally secured at one end to the brackets 9, 9 respectively. The generally central portions of the connectors 10, 10 are pivotally secured to the rods 12, 12 of a pair of cylinders 11, 11 pivotally secured at the base to the steps 2.

Posts 13, 13 of L-shape extend vertically from the steps 2, 2, respectively, and pulley blocks 14, 15 and 16 are supported at the base, and end of the lateral portion 13a of the posts 13, 13 and upper end of the post 13, respectively. The lower convex members 4, 4 have holes 17, 17, respectively at the center thereof. Ropes 19, 19 are secured at one end through the brackets 18, 18 onto the outer surface of the upper convex members 6, 6, respectively, and are inserted at the other ends through the pulley blocks 14, 15 and 16 and through the holes 17, 17 of the lower convex members 4, 4, respectively to the top inside of the upper convex members 6, 6. A plurality of collars 20, 20, 20 are attached in space to the ropes 19, 19 disposed in the cylinders 5, 5, and resilient strings 21, 22 are secured at one ends to the collars 20, 20 and are also secured at the other ends to the inner surface of the cylinder 5. Numerals 23 illustrate pipes for feeding compressed air to the floats and these are secured to the lower convex members 4, 4.

The operation of thus constructed apparatus of this invention will now be described.

Assuming that the under-water working vehicle A is on the water surface as shown in FIG. 1, the upper convex members 6, 6 drops by its own weight to cause the cylinders 5, 5 to be contracted. In this case, as the upper convex members 6, 6 falls, the ropes 19, 19 move in the direction designated by an arrow C in FIG. 1, so that the collars 20, 20 attached to the ropes 19, 19 drop accordingly with the result that the cylinders 5, 5 are drawn inwardly therein through the resilient strings 21, 22. Further, as the upper convex members 6, 6 drop further and the upper convex members 6, 6 match with the lower convex members 4, 4, respectively, the cylinders 5, 5 are contained in the container formed by the upper and lower convex members 6, 4. Thus, if both the upper and lower convex members 6, 4 match with each other, a hydraulic cylinder 11 is operated to extend the rod 12 so as to interlock the flanges 7, 8 of both upper and lower convex members 6, 4 by means of the connectors 10, 10 to cause both the upper and lower convex members 6, 4 to be secured to each other as shown in FIG. 2.

The under-water working vehicle A having contracted floats B shown in FIG. 2 may be submerged under water by proper means such as ropes so as to work as predetermined on the bottom of the water.

In order to float the vehicle A having contracted floats B shown in FIG. 2 from the bottom of the water to above the water surface, the hydraulic cylinder 11 is operated so as to contract the rods 12, disengage the connection of the connectors 10, 10 of the flanges 7, 8 of both upper and lower convex members 4, 6, and feed the compressed air through the pipes 23 into the floats B, and then the cylinders 5 are expanded so that the upper convex members 6, 6 elevate upwardly.

As the upper convex members 6 elevate upwardly, the rope 19 moves in the direction designated by an arrow D in FIG. 2 so that the collars 20, 20 elevate, and the resilient strings 21, 22 are extended to assume the condition as shown in FIG. 1. In this case, the water in the floats B is discharged outside from the holes 17, 17 by the compressed air. Thus, the vehicle A is floated from the bottom of the water to above the water surface by the increase of the buoyancy of the floats B expanded as in FIG. 1.

It should be understood from the foregoing description that since the apparatus for floating a vehicle for operating under water has contractible floats during work on the bottom of the water and during stoppage on the land, it is not bulky and improves the working efficiency on the bottom of the water in comparison with the constant volume of floats made all of metal which is not expansible nor contractible.

It should also be understood that since the apparatus of this invention contains the resilient cylinder of the floats between the upper and lower convex members upon contraction, it may protect the cylinder and may also prevent it from defects.

It should also be understood that since the apparatus of this invention secures both the upper and lower convex members integrally to each other upon contraction, and the floats may be held stably during operation.

The foregoing description, and the accompanying drawings show illustrative forms of construction according to this invention, but it will be understood that these forms are not restrictive, and that the invention may be practiced in many ways within the scope of the appended claims.

What is claimed is:

1. An apparatus for floating a vehicle for operating underwater comprising a pair of floats each having an upper convex member, a lower convex member, respectively, and each lower convex member having a hole on the bottom and secured to the side of the vehicle body, and a resilient cylinder mounted between each of said upper and lower convex members, and pipes for feeding compressed air into said floats, wherein said each upper convex member is continuous in structure without openings, and wherein a pair of ropes is included with each secured at one end to the outer surface of each said upper convex member respectively, and inserted at the other end through pulley blocks and through the holes of said lower convex members respectively and secured to the top inside of each said upper convex member respectively, and at least one pair of resilient strings for connecting said rope to the inner surface of said cylinder.

2. An apparatus according to claim 1, further comprising a pair of posts, each attached to the vehicle body adjacent to said floats, said pulley blocks comprising upper and lower pulley blocks attached to said posts.

3. An apparatus according to claim 1, further comprising first flanges provided at the uppermost edges of the outer periphery of each of said lower convex members respectively, second flanges provided at the lowermost edges of each of the outer periphery of said upper convex members respectively, at least two connectors pivotally secured at one end to the lower surface of each of said first flanges respectively for interlocking both said first and second flanges, at least two hydraulic cylinders pivotally secured at one end to the vehicle body and pivotally secured at the other end to said connectors.

4. An apparatus according to claim 1, further comprising a pair of posts each attached to the vehicle body adjacent to said floats, said pulley blocks comprising upper and lower pulley blocks attached to said posts, first flanges provided at the uppermost edges of each of the outer periphery of said lower convex members respectively, second flanges provided at the lowermost edges of the outer periphery of each of said upper convex members respectively, at least two connectors pivotally secured at one end to the lower surface of said first flanges for interlocking both said first and second flanges, at least two hydraulic cylinders pivotally secured at one end to the vehicle body and pivotally secured at the other end to said connectors.

* * * * *